United States Patent [19]
Barrett

[11] 3,957,018
[45] May 18, 1976

[54] MILKING APPARATUS
[76] Inventor: Jeremiah Barrett, Mullinahone, County Tipperary, Ireland
[22] Filed: Sept. 20, 1974
[21] Appl. No.: 507,735

[30] Foreign Application Priority Data
Sept. 20, 1973 Ireland.............................. 1682/73

[52] U.S. Cl. .......................................... 119/14.08
[51] Int. Cl.² ............................................ A01J 7/00
[58] Field of Search....................... 119/14.08, 14.17

[56] References Cited
UNITED STATES PATENTS
3,556,053   1/1971   Padman et al.................. 119/14.08

Primary Examiner—Hugh R. Chamblee
Attorney, Agent, or Firm—Young & Thompson

[57] ABSTRACT

The invention concerns a device for removing the teat-cup cluster of a milking machine from the animal at the end of milking. The device comprises a container connected to the milk line from the teat-cups. The container is mounted on a fulcrum and when the container contains a certain volume of milk it tilts into an activated position. When the volume of milk in the container drops to a certain level the container tilts back to release a spring-loaded lever which then pinches the milk line to cut off the teat-cups from the vacuum source, and, at the same time, the lever causes a cylinder and piston device to retract the teat-cup cluster from the animal.

16 Claims, 12 Drawing Figures

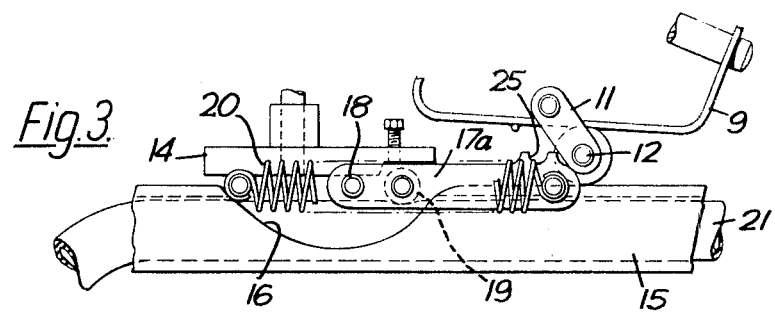
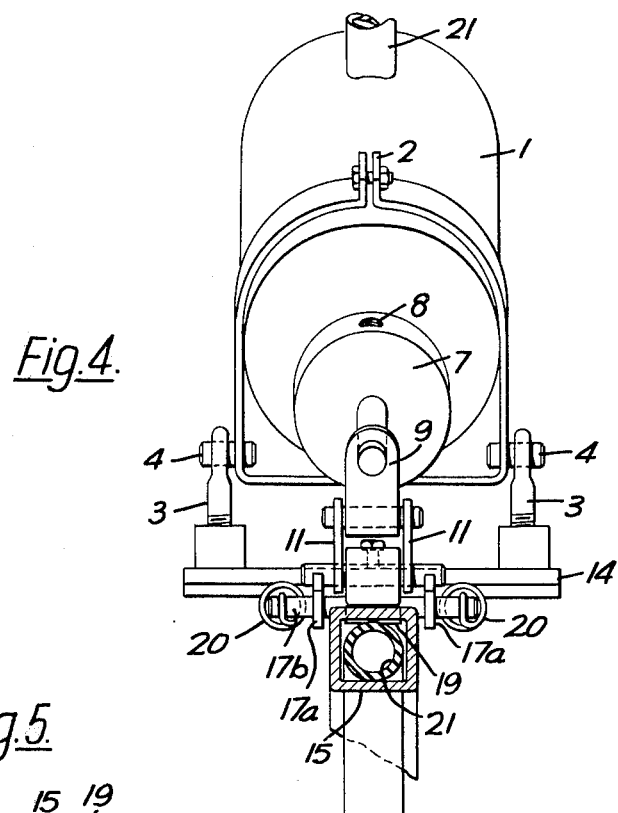
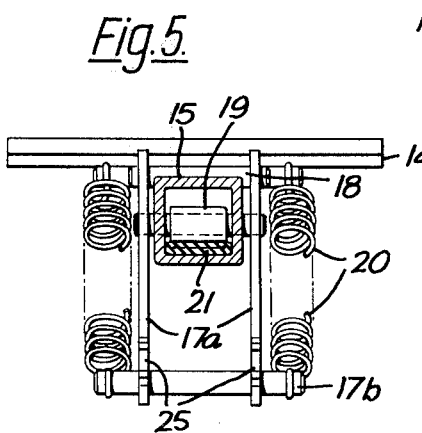

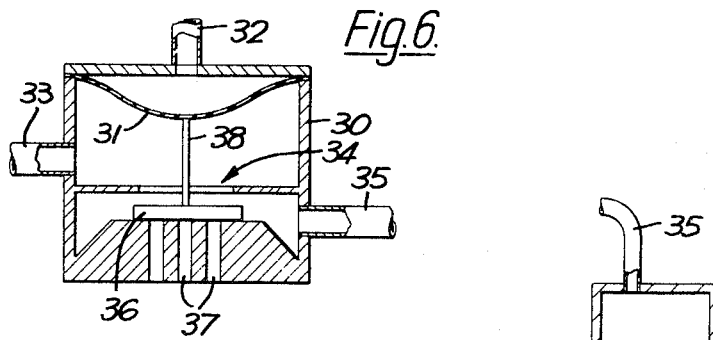
Fig.6.
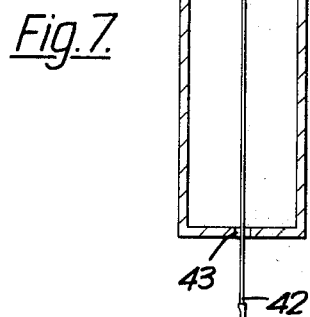
Fig.7.
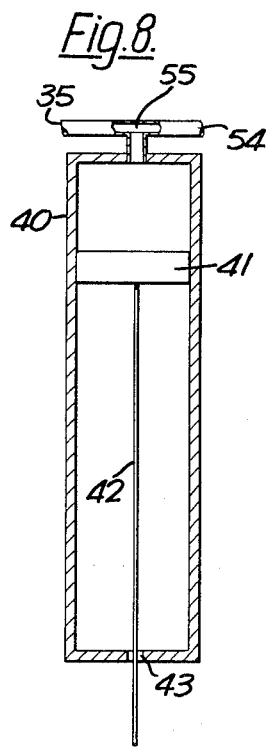
Fig.8.
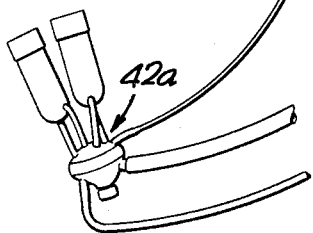

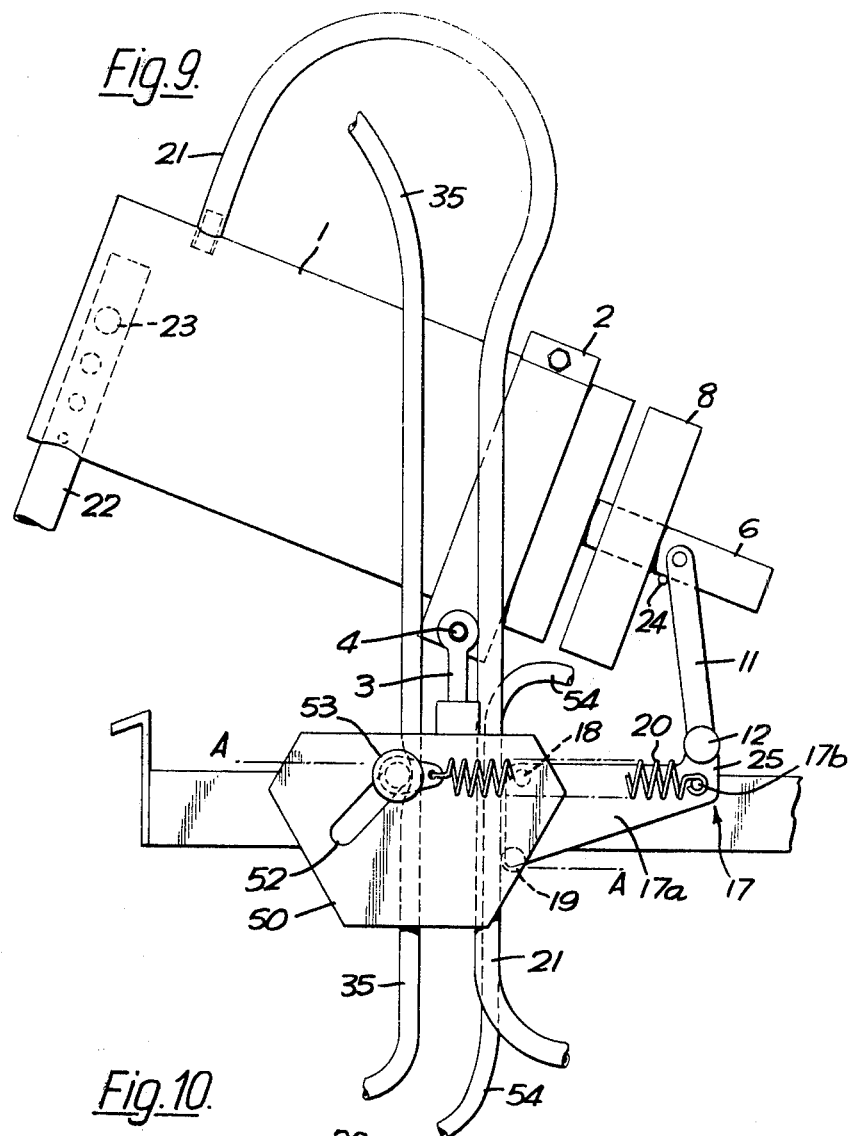
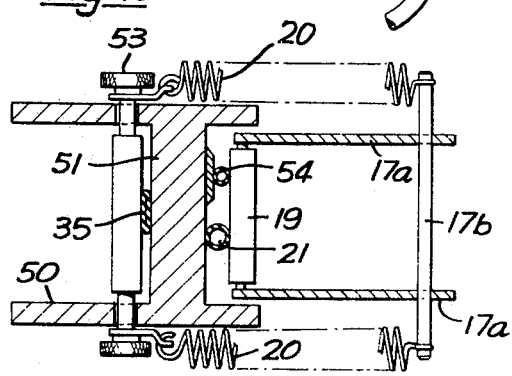

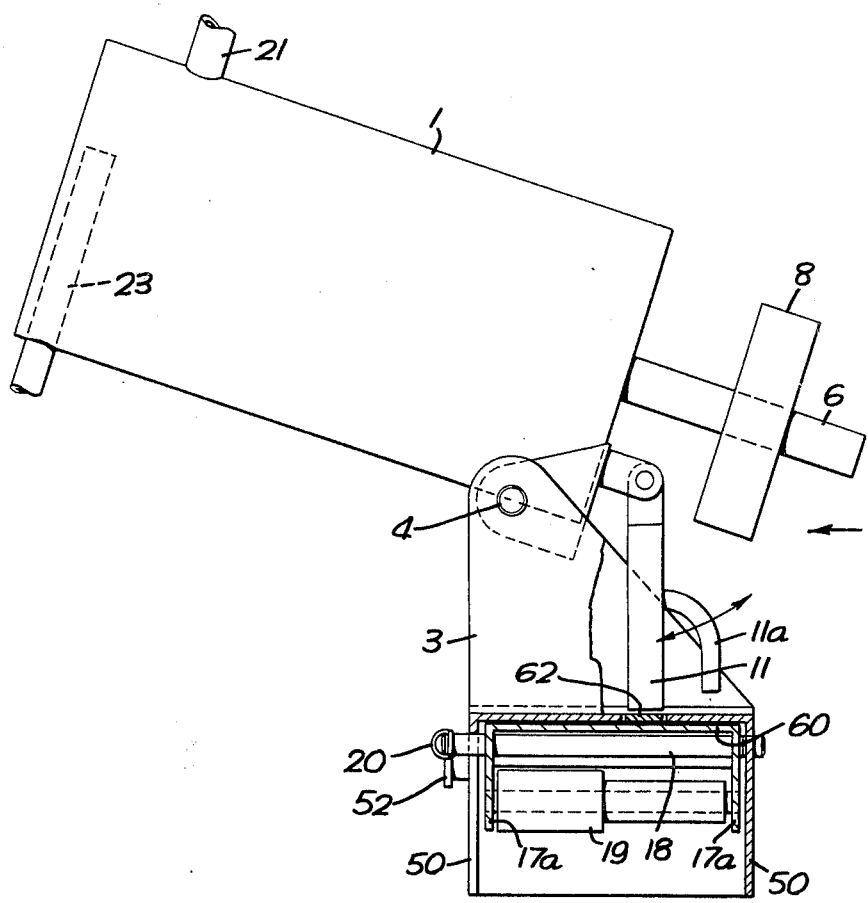

MILKING APPARATUS

BACKGROUND OF THE INVENTION

The invention relates to improvements in and relating to milking machines, and is particularly concerned with apparatus for use in removing a teat-cup cluster from the animal being milked when milk flow has dropped to a predetermined level.

It is well recognised in dairy farming that it is important to remove the teat-cups from the cow being milked as soon as possible after the flow of milk from the udder diminishes to a certain level as the continued application of vacuum to the teats after the end point of milking has been reached is uneconomical and may be damaging to the udder. Furthermore, it is believed by some dairy farmers that overmilking increases the risk of mastitis. It is well known in modern milking parlours to utilize devices which visually indicate when the end point of milking has been reached. However, with such devices the teat cups must be removed manually and this imposes quite a strain on the operator handling a large number of cows in a "herring-bone" parlour, for example, as he must watch all of the indicators along the parlour and he must endeavour to remove the teat-cups from a large number of cows who may well cease milking about the same time. It is thus necessary in such parlours to employ a number of operators so as to ensure that milking proceeds efficiently and quickly. Means which automatically remove the teat-cup cluster from the cow when the end-point of milking has been reached increase the number of cows an operator can handle in a "herring-bone" type parlour and can enable a rotary parlour to be handled by one operator.

Automatic cluster removal systems are known in which photoelectric cells, conductivity cells or electronic microswitches, which are sensitive to milk flow, operate at the end of milking to actuate removal means, such as hydraulic or pneumatic rams, which withdraw the teat-cup cluster from beneath the cow. It has been found that these electronically operated systems are not reliable in use, and besides, are somewhat too complicated and expensive for the average farmer. Furthermore, they require an electrical supply at the milking stall which can be dangerous.

It is an object of the present invention to provide apparatus for removing a teat-cup cluster from an animal being milked including a milk flow rate sensing unit which reacts directly to the milk flow characteristic of each cow.

SUMMARY OF THE INVENTION

According to the invention a milk flow rate sensing unit comprises a container having a milk inlet adapted for connection by a milk line to a teat-cup cluster and a milk outlet adapted for connection by a milk line to milk receiver means and a vacuum source, the container being mounted upon a fulcrum at or adjacent one end of the container such that the container may rock upon the fulcrum, and counterbalancing means for the container positioned to that side of the fulcrum opposite the major portion of the container, the counterbalancing means being so arranged that when empty the container is overbalanced by the counterbalancing means and rests in a first position but when the milk flow into the container is such that milk in the container exceeds a predetermined volume the container overbalances the counterbalancing means and tilts from the first position into a second position where it remains until milk flow falls such that the milk in the container is below a predetermined volume whereupon it tilts back towards the first position to actuate cut-off means for disconnecting the teat-cups from the vacuum source. Preferably, the container is cylindrical and is so mounted on the fulcrum that as the container rocks its longitudinal axis moves through a horizontal plane.

Preferably, the milk line connected to the milk inlet is, at least in part, a flexible tube and the vacuum cut-off means comprises a spring-loaded cut-off lever which is released by the tilting container and which when so released pinches the flexible tube to disconnect the teat-cups from the vacuum source. The device may include a pivotally mounted actuating arm which when the container moves from the first position into the second position is adapted to swing under gravity from a rest position to an activated position such that when milk flow drops and the container tilts back towards the first position, the actuating arm strikes the spring-loaded cut-off lever to release same.

The invention also includes means for removing a teat-cup cluster from an animal being milked which comprises an elongated cylinder, a piston movable within the cylinder and connecting means such as a cord or the like, connecting the piston with the teat-cup cluster. In one embodiment the cylinder, to the side of the piston remote from the connecting means, is connected to one inlet of a diaphragm valve, the other side of which is connected to the flexible tube between the teat-cup cluster and the vacuum cut-off means. The diaphragm valve is so arranged that when vacuum is applied to one side the other side is connected to atmosphere and vice versa. In a preferred embodiment, the cylinder, to the side of the piston remote from the connecting means, is connected by a flexible vacuum tube to the vacuum source and by a flexible air tube to atmosphere. The spring loaded lever of the vacuum cut-off means is so arranged that when the lever is cocked the loaded spring causes said first flexible tube to be pinched thus disconnecting the cylinder from the vacuum source and leaving it open to atmosphere through the said second flexible tube. The piston is then free to move downwardly in the cylinder and the teat-cups can be applied to the cow. The second tube is preferably positioned alongside the flexible tube leading from the teat-cup to the vacuum source. When milking ceases the spring loaded lever operates to pinch the teat-cup tube and also the said second flexible tube at the same time releasing the first flexible tube. The cylinder is now closed to atmosphere and connected to vacuum and the piston is withdrawn up the cylinder.

Some embodiments of the invention will now be described with reference to the accompanying drawings, wherein:

FIGS. 2 and 3 are side elevations of a detail of the device shown in FIG. 1;

FIG. 4 is an end elevation in the direction of the arrow shown in FIG. 1;

FIG. 5 is an end elevation in the direction of the arrow shown in FIG. 2,

FIG. 6 is a sectional elevation, to an enlarged scale, of a three-part diaphragm valve;

FIG. 7 is a sectional elevation of a first teat-cup cluster withdrawal device.

FIG. 8 is a sectional elevation of a second teat-cup cluster withdrawal device;

FIG. 9 is a side elevation of a second embodiment of a milk flow rate sensing device;

FIG. 10 is a section of the line A-A of FIG. 9.

FIG. 11 is a side elevation, partly in section, of a third embodiment of a milk flow rate sensing device of the invention.

Figure 1:
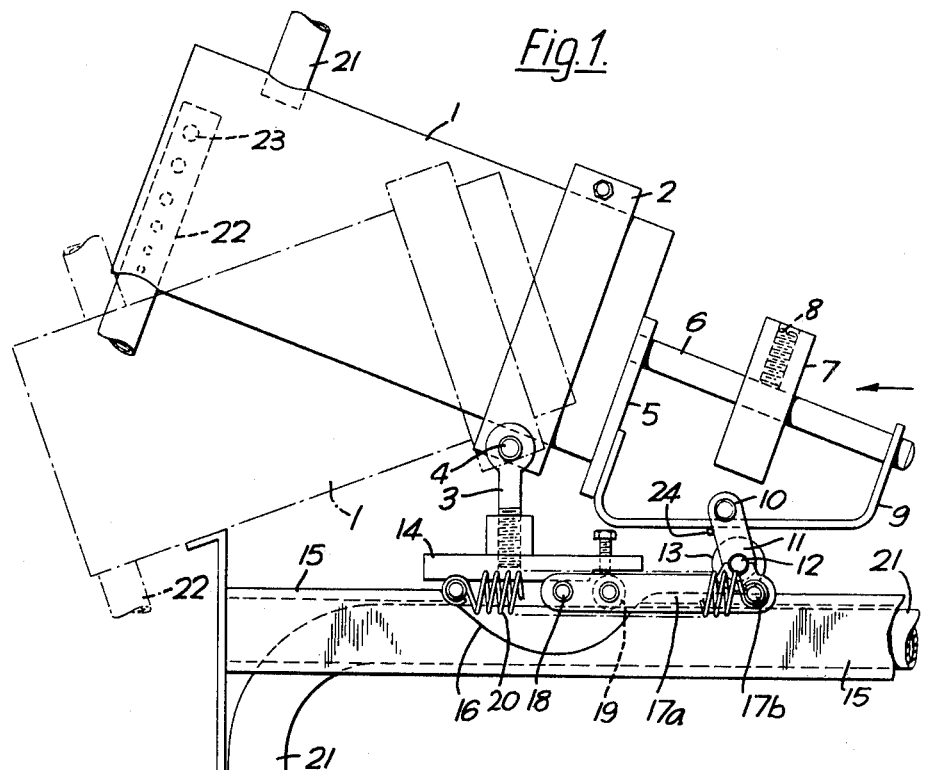
FIG. 1 is a side elevation of a first embodiment of a milk flow rate sensing device according to the invention.

Referring to FIGS. 1 to 5 of the drawings, a milk flow rate sensing device comprises a cylindrical container 1 of glass, transparent plastics material, or stainless steel, securely held adjacent one end thereof in a cradle 2. The cradle 2 is pivotally mounted on a bracket 3 by means of a pivot pin 4 such that the container may tilt, through a horizontal plane, about the pivot pin. A metal plate 5 is affixed to the end wall of the cylinder adjacent the cradle 2. The plate 5 supports one end of a threaded spindle 6 which is disposed axially of the container. A metal weight 7 is threaded on the spindle 6 and can be secured at any desired position on the spindle by means of a set-screw 8. The weight 7 acts to counterbalance the cylinder 1. A substantially U-shaped bracket 9 is secured at one end of the plate 5 and at its other end to the end of the spindle 6. The bracket 9 hangs beneath the spindle. A pin 10 is welded or otherwise secured to the bracket 9 about mid-way along the bracket. A pair of arms 11 are rotatably mounted on the pin 10. A pin 12 protrudes laterally to each side of the free ends of the arms 11. A rubber edged wheel 13 is rotatably mounted at each end of the pin 12.

The bracket 3 is carried by a flat metal plate 14 which is fixed to a support 15. The support 15 comprises a hollow metal tube which can be secured to the wall of the milking parlour at any convenient position. The device is mounted in such a way that the pins 4 and 10 lie in substantially horizontal planes. The top and side walls of the pipe 15 are cut away to provide an opening 16 positioned immediately below and to one side of the plate 14. A lever 17 is pivotally mounted below the plate 14 and above the opening 16. The lever comprises two arms 17a which are spaced to each side of the pipe 15 and which are adapted to pivot in parallel relation about a pivot pin 18. The arms 17a are bridged by a roller bar 19 which is spaced from but arranged axially parallel to the pivot 18. The free ends of the arms 17a are provided with stub pins 17b. A pair of strong helical springs 20 connect the free ends of the arms 17a with the fixed plate 14.

A rubber tube 21 leads from the teat-cup cluster (not shown) through the pipe 15 and into the container 1. The outlet from the container comprises a rigid pipe 22. The pipe 22 extends upwardly from the floor of the container and terminates near the top of the container. The top of the pipe 22 is open. A plurality of openings 23 are provided in the wall of the pipe at spaced intervals. The diameter of the openings increase as they progress up the pipe. The pipe 22 is joined by tubing to the milk receiver or releaser, and to the source of vacuum.

When empty the container 1 is overweighed by the counterweight 8, and so at the start of milking the container is in the position shown in full lines in FIG. 1. However, the arms 11 are in the position shown in FIG. 3. The operator moves the lever 17 anticlockwise from the position shown in FIG. 2, against the pull of the springs 20, to the position shown in FIG. 3. The lever 17 is passed slightly overcentre so that the springs tend to pull it in an anticlockwise direction. However, movement of the lever in that direction is prevented by the plate 14 and the lever thus remains in the cocked position as shown in FIG. 3 with the wheeled arms 11 resting on the pipe 15 at a point behind the end of the lever 17. When milking commences, vacuum is applied to the container and through pipe 21 to the teat-cups and milk begins to flow from the teat-cups through the pipe 21 and into the top of the container.

The milk flowing into the container will, of course, begin to accumulate at the right hand end of the container, as shown in the drawings, and as the volume increases will flow upwardly towards the lowermost holes 23 in the tube 22. The counterbalancing arrangement is such that when about 680 gm of milk accumulate in the container, the container will tilt downwardly until it is in the position shown in broken lines in FIG. 1. This tilting movement effectively activates the device. It will be appreciated, therefore, that activation is dependent not on a time interval, as with the majority of mechanical flow rate sensing devices, but on the volume of milk released by the cow. Thus if a particular cow is slow to begin milking the device will accommodate her and will not tilt into the activated position until there is a regular flow of milk, unlike some known devices which tend to activate vacuum cut-off means prematurely due to the fact that there may be an erratic flow of milk at the beginning of milking.

As mentioned previously, the wheeled arms 11 are pivotally mounted on the bracket 9 and so they tend to assume a vertical position. However, they are so positioned that when the lever 17 is cocked, that is in the position shown in FIG. 3, the arms 11 are prevented from moving to the vertical as they are resting at an angle to the pipe 15. However, when the container tilts into the activated position the arms are lifted from contact with the pipe 15 and are free to move clockwise from the position shown in FIGS. 2 and 3 until they strike a stop 24.

In the activated position milk will leave the container by way of the open end of the pipe 22 and also through the holes 23. Because the top of the pipe 22 is spaced from the top of the container the container will not completely fill and this ensures a steady application of vacuum to the teat-cups. As long as there is about 450 gm of milk in the container it will remain in the activated position. In the event that a cow may stop milking prematurely the milk level will drop quickly until it is below the open end of the pipe 22. Milk will continue to drain through the holes 23 but as the level of milk in the container drops so also does the overflow rate, and thus the container remains in the activated position for a sufficiently long time as to cater for any temporary halt in the flow of milk.

Figure 2:
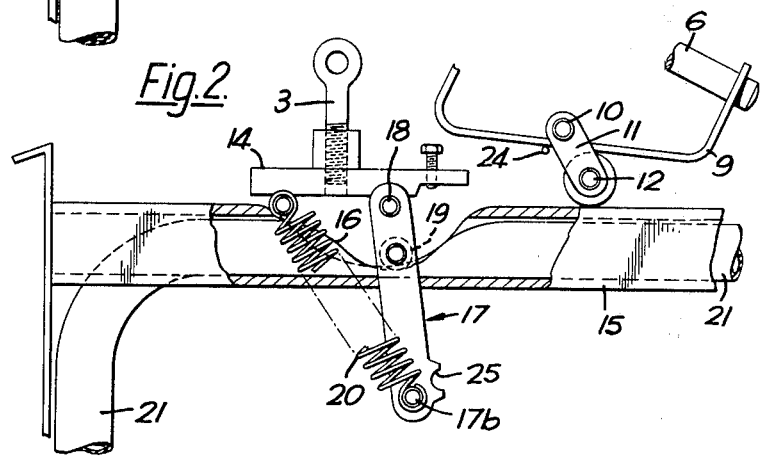

When milk flow from the cow finally drops to about 225 gm per minute the volume retained in the container is not sufficient to balance the counterweight, and the container tilts smartly upwards gaining momentum as it rises. The arms 11 and the stop 24 are so positioned on the bracket 9 that as the bracket and counterweight descend the pin 12 strikes a cradle 25 which is positioned at the end of the lever 17. This causes the lever 17 to pass back overcenter and it moves, in a clockwise direction, with considerable force under the influence of the retracting spring 20. In the position of the container as shown in FIG. 1 the pin 12 is about to strike the cradle 25. As the lever 17 moves clockwise the roller bar 19 enters the aperture 16 and presses upon and pinches the flexible tube 21, as shown in FIG. 2. This effectively closes the tube thus cutting-off the teat-cups from the vacuum source. Without a continuous application of vacuum the teat-cups lose their grip on the teats because of the fact that there is a bleed aperture in the teat-cup cluster which allows a slight ingress of air to the teat-cups. Indeed, the teat-cups may slowly fall from the teats under force of gravity.

Apparatus for withdrawing the teat-cups from the cow is shown in FIGS. 6 and 7. FIG. 6 shows a three-way diaphragm valve comprising a valve housing 30 separated into two compartments 30a and 30b by a flexible membrane or diaphragm 31. A valve inlet 32, to one side of the diaphragm, is connected by suitable piping and a T-junction to the milk line 21 at a point between the teat-cups and the vacuum cut-off device. The compartment 30b to the other side of the diaphragm is connected by a pipe 33 to a source of constant vacuum. A third valve opening 34 may be connected by means of a pipe 35 to teat-cup cluster withdrawal means. A disc 36 is positioned between the outlet 34 and a port 37 which is open to atmosphere. The disc 36 is connected to the diaphragm 31 by a rigid rod 38 and is movable in response to the diaphragm from a first position where it closes outlet 34 and so connects pipe 35 with the atmosphere via port 37, to a second position where it closes port 37 and connects pipe 35 with the interior of the valve and with the source of constant vacuum.

A teat-cup cluster withdrawal means is shown in FIG. 7 and comprises an elongated cylinder 40 having a piston 41 movable therein. The cylinder is about 3 ft. in length and has an inner diameter of about 1¾ inches. The cylinder is preferably mounted on the milking stall to one side of the position occupied by the cow and is positioned about 5 feet above the floor of the stall. A cord 42 is fastened at one end to the underside of the piston 41, leads through an opening 43 in the lower end of the cylinder, and is fastened at its other end to the teat-cup cluster. The length of the cord is so adjusted that when the piston 41 is at the lower end of the cylinder the teat-cup cluster hangs freely below the cow. If necessary the cord may pass through a suitable pulley system.

Before milking commences the piston must be lowered in the cylinder to enable the teat-cups to be fitted on the udder of the cow. During milking the piston 41 is at the lower end of the cylinder 40. When the end point of milking is reached the sensing device operates to actuate the vacuum cut-off device as described above. When the teat-cups are disconnected from the vacuum source air from the atmosphere enters the teat-cups and flows through pipe 21 and thence through pipe 32 thus effectively opening that compartment 30a of valve 30 to atmosphere. As the other compartment 30b is subjected to constant vacuum the diaphragm is caused to move away from inlet 32. This movement of the diaphragm, in turn, causes the disc 36 to seat on port 37 thus connecting pipe 35 and the upper part of cylinder 40 to the source of constant vacuum. The piston 41 is withdrawn up the cylinder and gently pulls the loose teat-cups from the cow. The cow suffers no discomfort as, unlike other types of teat-cup withdrawal devices, the vacuum to the teat-cups is cut-off before the withdrawal apparatus is activated.

If desired, the three-part diaphragm valve may be housed at the end of the cylinder 1 adjacent the counterweight so as to facilitate cleaning.

In the embodiment shown in FIGS. 9 and 10, the container 1 is mounted in substantially the same manner as in the embodiment of FIG. 1 and like parts are indicated by the same reference numerals. However, in this embodiment a metal plate 50 is mounted to each side of the support pipe 15 and the plates are joined by a connecting piece 51 to form a section of substantially I-shape. A slot 52 is formed in each plate 50 and the slot is disposed at about 45° to the longitudinal axis of pipe 15. A roller 53 is disposed between the plates and the ends thereof are constrained to move in the slot 52. A flexible tube 35, which is connected at one end to the vacuum source and at the other end to the cluster withdrawal means, passes upwardly between the roller 53 and one side of the connecting piece 51. The lever 17 is mounted between the plate 50 to the other side of the connecting piece 51.

In this embodiment the lever arms 17a are of substantially triangular shape and are pivotally mounted at one corner thereof about a pivot pin 18 disposed between the plates 50. The roller 19 is rotatably mounted between the arms 17a at an adjacent corner, and the cradle 25 is carried by the arms 17a at the remaining corner. The helical springs 20 are connected at one end to the ends of the roller 53 and at the other end to a point on the lever arms 17a below the cradle 25.

The flexible tube 21 which leads from the teat-cup cluster to the vacuum source passes upwardly through the aperture 16 in the pipe 15 and between the roller 19 and the connecting piece 51. A second flexible tube 54 is arranged alongside the tube 21. The tube 54 is open at one end to the atmosphere and is connected at the other end to the cluster withdrawal means.

The cluster withdrawal means for use with this embodiment is illustrated in FIG. 8. It comprises a cylinder 40 having a piston 41 movable therein. The piston is provided with suitable piston rings. A cord 42 is connected to the underside of the piston and leads through an opening 43 at the lower end of the cylinder, and is fastened at its other end to the teat-cup cluster. A T-piece 55 is connected to the upper part of the cylinder 40. The flexible tube 35 is connected to one side of the T-piece and the flexible tube 54 to the other side.

When milking is about to commence the operator moves the lever 17 into the position shown in FIG. 9. This action tightens the springs 20 which cause the roller 53 to move upwards in slot 52. The roller squeezes the flexible tube 35 against the cross-piece 51 thus effectively closing the tube and disconnecting the upper part of cylinder 40 from the vacuum source. At this stage the upper part of cylinder 40 is open to atmosphere through tube 54 and the piston can be lowered in the cylinder in order to fit the teat-cups. Tube 21 is also open and connects the teat-cups with the vacuum source. Milking then commences and the apparatus operates as described with reference to FIGS. 1 to 5. At the end of milking the container tilts backwards and the pin 12 strikes the cradle to release the spring-loaded lever 17. In FIG. 9 the lever is shown about to strike the cradle. The lever pivots downwardly under the action of the retracting springs and the roller 19 pinches the tube 21 thus cutting-off the teat-cups from the source of vacuum. The roller simultaneously pinches and closes the tube 54 to disconnect the upper part of cylinder 40 from atmosphere. Because of the fact that the ends of the springs 20 which are connected to the arms 17a are now disposed below and to one side of the slot 52 they cause the roller 53 to move downwardly in the slots thus releasing the tube 35. The upper part of the cylinder is now connected to vacuum via tube 35 and the piston is drawn up the cylinder and as it moves upwardly it withdraws the teat-cup cluster by means of cord 42. It will thus be appreciated that in this embodiment the three-way diaphragm valve is not required.

Figure 12:
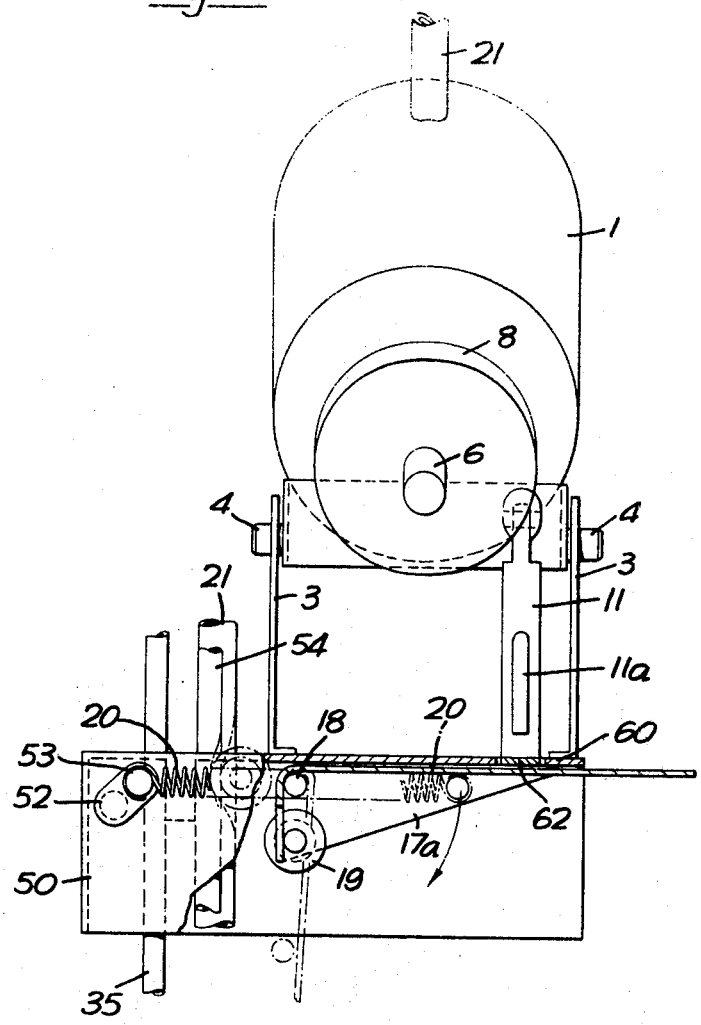
FIG. 12 is an end elevation in the direction of the arrow shown in FIG. 11.

The embodiment shown in FIGS. 11 and 12 is substantially similar to that shown in FIGS. 9 and 10, and like parts are indicated by like reference numerals.

In this arrangement the cut-off lever 17a is partly of inverted-channel shape and is disposed transversely of the longitudinal axis of the container 1. The I-shaped section formed by the sides 50 and connecting piece 51 is provided with a cover 60. An aperture 61 is formed in the cover 60 and a boss 62 on the lever 17a is adapted to fit within the aperture when the lever is in the loaded position as shown in FIGS. 11 and 12.

In this embodiment a single arm 11 is pivotally connected to the end of the container and in the rest position of the container this arm rests on the lateral edge of the cover 60. However, as the container tilts into the milking position the arm moves into a substantially vertical position and when the container tilts back into the rest position the arm 11 strikes the boss 62 to release the spring-loaded cut-off lever 17a. The roller bar 19 at the free end of the lever 17a has two parts 19a and 19b. Part 19a is of larger diameter than part 19b. The flexible milk line 21 is of larger diameter than the flexible air tube 54 and the larger roller part 19a serves to pinch the smaller tube 54 while the smaller roller part serves to pinch the larger tube 21. The arm 11 is provided with a finger piece 11a to facilitate the re-setting of the arm.

I claim:

1. A milk flow rate sensing device comprising a container having a floor portion and provided with a milk inlet adapted for connection by a milk line to a teat-cup cluster, and a milk outlet adapted for connection by a milk line to milk receiver means and a vacuum source, the container being mounted upon a fulcrum at or adjacent one end of the container such that the container may rock about the fulcrum so as to alter the inclination of the floor portion of the container relative to the horizontal, and counterbalancing means for the container positioned to that side of the fulcrum opposite the major portion of the container, the counterbalancing means being so arranged that when empty the container rests in a first position but when milk flow into the container is such that milk in the container exceeds a predetermined volume the container overbalances the counterbalancing means and tilts from the first position into a second position where it remains until milk flow falls such that the milk in the container is below a predetermined volume whereupon it tilts back towards the first position to acutate cut-off means for disconnecting the teat-cups from the vacuum source.

2. A milk flow rate sensing device according to claim 1 wherein the milk outlet is positioned adjacent the end of the container remote from the counterbalancing means.

3. A milk flow rate sensing device according to claim 2, wherein the milk outlet comprises an outlet pipe which extends upwardly through the floor of the container and has a main opening near the top of the container.

4. A milk flow rate sensing device according to claim 3, wherein secondary openings in the pipe are provided at spaced intervals along the length of the pipe.

5. A milk flow rate sensing device according to claim 4, wherein the secondary openings progressively increase in size towards the top of the pipe.

6. A milk flow rate sensing device according to claim 1, wherein the counterbalancing means comprises a counterweight adjustably positioned upon a spindle which extends axially from the end of the container.

7. A milk flow rate sensing device according to claim 1, wherein the container is cylindrical.

8. A milk flow rate sensing device according to claim 7, wherein the cylinder is made of a rigid transparent plastics material.

9. A milk flow rate sensing device as claimed in claim 1 in which the milk line connected to the milk inlet is, at least in part, a flexible tube and the device includes vacuum cut-off means for disconnecting the teat-cups from the vacuum source comprising a spring-loaded cut-off lever which is adapted to be released by the tilting container and which when so released pinches the flexible milk line to disconnect the teat-cups from the vacuum source.

10. A milk flow rate sensing device as claimed in claim 9 including a pivotally mounted actuating arm which when the container moves from the first position into the second position is adapted to swing under gravity from a rest position to an activated position such that when milk flow drops and the container tilts back towards the first position the actuating arm strikes the spring-loaded cut-off lever to release same.

11. A milk flow rate sensing device as claimed in claim 10 wherein the cut-off lever comprises two pivotally mounted spaced-apart parallel arms joined together at their free ends by a pinch roller, the free ends of the arms being connected to a fixed mount for the device by a pair of springs.

12. A milk flow rate sensing device according to claim 9 associated with apparatus for removing the teat-cups from the animal being milked said apparatus comprising an elongated cylinder, a piston movable within the cylinder and connecting means, such as a cord or the like, connecting the piston with the teat-cup cluster.

13. A milk flow rate sensing device according to claim 12, wherein the cylinder, to the side of the piston remote from the connecting means, is connected by a flexible vacuum tube to the vacuum source, and by a flexible air tube to atmosphere, the arrangement being such that when the cut-off layer is released it pinches and closes both the flexible milk line and the flexible air tube and at the same time opens the flexible vacuum tube.

14. A milk flow rate sensing device according to claim 13, wherein means are provided for closing the flexible vacuum tube, the means comprising a pinch roller constrained in a slot and connected to the free end of the cut-off lever by a spring such that when the cut-off lever is loaded the spring is under tension and causes the pinch roller to close the vacuum line so long as the cut-off lever remains in the loaded position.

15. A milk flow rate sensing device according to claim 12, wherein the cylinder, to the side of the piston remote from the connecting means, is connected to one side of a diaphragm valve, the other side of which valve is connected to the milk line, the arrangement being such that when one side of the valve is under vacuum the other side is connected to atmosphere.

16. A milk flow rate sensing device according to claim 15, wherein the diaphragm valve comprises a housing separated into two compartments by a flexible diaphragm, an inlet in one compartment is connected to the milk line, and an inlet in the second compartment is connected to a vacuum source, said second compartment having a valve opening leading to atmosphere and closable by a valve head connected by a rigid arm to the diaphragm.

* * * * *